United States Patent
Butterworth

[11] Patent Number: 5,770,243
[45] Date of Patent: Jun. 23, 1998

[54] VACUUM BAGGING APPARATUS

[75] Inventor: Peter Butterworth, Rochdale, England

[73] Assignee: Launchfirm Ltd., Keighley, United Kingdom

[21] Appl. No.: 335,888

[22] PCT Filed: Apr. 14, 1993

[86] PCT No.: PCT/GB93/00774

§ 371 Date: Jan. 16, 1995

§ 102(e) Date: Jan. 16, 1995

[87] PCT Pub. No.: WO93/20907

PCT Pub. Date: Oct. 28, 1993

[30] Foreign Application Priority Data

May 15, 1992 [GB] United Kingdom ............... 9210461

[51] Int. Cl.[6] .................................................. B29C 70/44
[52] U.S. Cl. ...................... 425/389; 156/285; 156/382; 264/316; 264/571; 425/405.1
[58] Field of Search ............... 425/389, 405.1, 425/504; 156/285, 382; 264/316, 571

[56] References Cited

U.S. PATENT DOCUMENTS

| | | |
|---|---|---|
| 4,216,047 | 8/1980 | Hilliard et al. ............... 156/285 |
| 4,323,413 | 4/1982 | Trempe ............................ 156/285 |
| 4,886,442 | 12/1989 | McCowin et al. ............... 425/405.1 |
| 5,433,165 | 7/1995 | McGuiness et al. ............ 264/571 |

FOREIGN PATENT DOCUMENTS

| | | | |
|---|---|---|---|
| 0175510 | 3/1986 | European Pat. Off. . | |
| 2629010 | 9/1989 | France .......................... | 156/285 |
| 585074 | 12/1977 | U.S.S.R. ....................... | 425/389 |
| WO 87/05557 | 9/1987 | WIPO ........................... | 156/285 |

*Primary Examiner*—Robert Davis
*Attorney, Agent, or Firm*—Kohn & Associates

[57] ABSTRACT

An apparatus for forming composite articles which include the stretchable or pre-shaped membrane adapted to be placed on a mold in a ridged framework carrying an outer seal. An inner seal is attached to the membrane and located between the membrane and the inner side of the rigid framework defining a vacuum cavity. The membrane is attached to the seal at the lower most point thereof. The seals are substantially square in section and have cut-out sections to enhance resilience. The seals have a outwardly directed downwardly extended curtain portion to form a initial loose seal with a mold base.

6 Claims, 2 Drawing Sheets

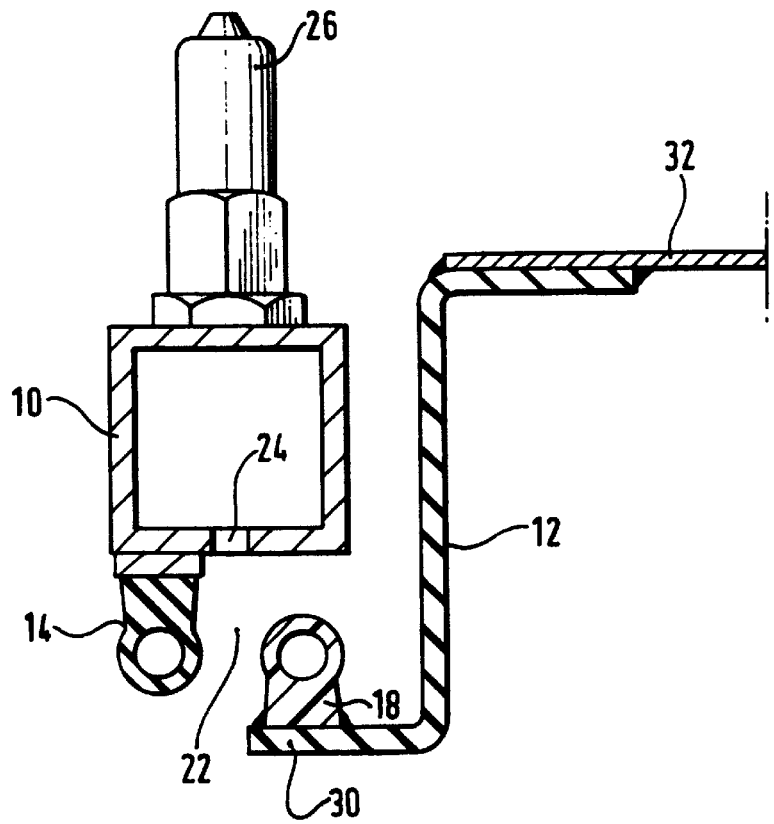
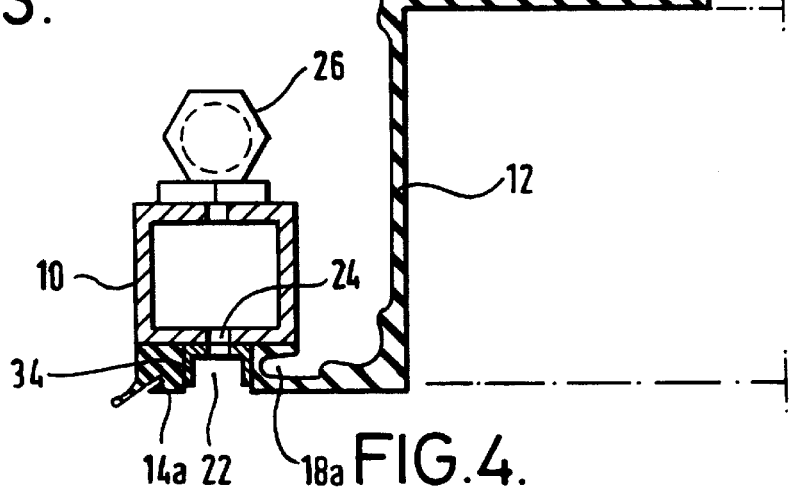
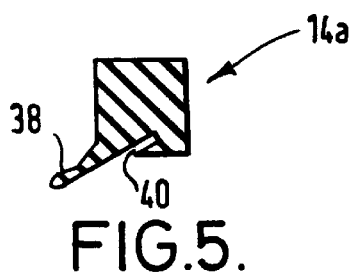

VACUUM BAGGING APPARATUS

BACKGROUND OF THE INVENTION

1. Field of the Invention

This invention relates to an apparatus useful in the production of composite products by the vacuum bagging system and in particular relates to an improved seal therefor.

2. Description of Related Art

Vacuum bagging is the term used to describe a method of producing pressure and vacuum on various resin filled, carbon, glass, synthetic material and metal laminates known as composites while curing and consolidation takes place, usually by means of heating in a pressurised autoclave or oven or hydraulic press. The method may be used in the production of various composite parts useful in the aircraft and motor industries as well as for the production of things such as printed circuit boards for the electronic industry.

EP-A-0175510 describes an apparatus of the type described which comprises a stretchable membrane or vacuum bag held within a rigid framework which is hollow and forms a vacuum manifold supplying vacuum to a seal affixed to the membrane and carried on the framework by one or more passages communicating with a cavity, the resilient seal defined in the cavity within which vacuum can be drawn when the framework and membrane are placed on a mould base. This system has been found to be very effective and the double seal arrangement defining a cavity within which vacuum can be drawn is much more secure than single seal arrangements since the cavity is considerably larger than the cavity adjacent to a single seal and thus a greater clamping effect can be obtained than with any single seal arrangement giving much more security to the vacuum bag.

However, the membrane in the system of the above mentioned European patent publication is subject to maximum stress adjacent to the inner seal and this is the most common point of failure when a vacuum bag apparatus becomes worn. The present invention seeks to provide a sealing arrangement improved in this respect. WO87/05557 discloses an apparatus comprising a stretchable membrane with rigid sections attached to a rigid hold down frame. The frame carries outer and inner sections defining a vacuum cavity and the inner seal is attached to the membrane.

SUMMARY OF THE INVENTION

According to the present invention there is provided an apparatus for forming composite articles which comprises a stretchable or pre-shaped membrane (12) adapted to be placed on a mould and a rigid framework (10) carrying an outer seal (14a), there being an inner seal (18a) attached to the membrane and located between the membrane and the inner side of the rigid framework (10) defining a vacuum cavity (22), the membrane being attached to the seal at the lower-most point thereof characterised in that the seals are substantially square in section and have cut-out sections (36, 40) to enhance resilience, and in that the outer seal has an outwardly directed downwardly extending curtain portion (38) to form an initial loose seal with a mould base.

In the apparatus of the invention the membrane is attached to the bottom of the seal rather than the top as in the above mentioned European patent publication. This ensures that the membrane lies flat against the mould base and the point of stress referred to above is eliminated.

Moreover, where desirable as discussed more fully hereinafter, the seal may be affixed to the membrane only, and not to the vacuum manifold (in contrast to WO87/05557). That is, the outer seal will be fixed to the vacuum manifold but the inner seal need be fixed only to the membrane, and the cavity between them is defined when the two are assembled. This has the advantage that a number of membranes of different pre-shaped sizes may be provided with a single manifold thus allowing stacks of composites of different sizes and configuration to be moulded without requiring a separate seal and manifold assembly for each one, the manifold being constant and only the membrane changing. This reduces both expense and storage problems associated with the membrane and manifold assemblies. The membranes can, of course, be folded and are therefore much easily stored. In a typical application, the manifold would be made of a size to fit in the shelf of a given autoclave and a number of membranes would be supplied to accomodate different sizes and configurations of composite layout. In this embodiment it may be helpful, to assist handling the frame and membrane, to use a temporary mastic or sealant tape between the seal and the bottom of the frame which would hold the membrane to the frame for one or more vacuum cycles.

Furthermore, while the manifold can be a hollow manifold as disclosed in the above mentioned European patent publication, it is possible to reduce the height of the manifold by making it in effect a flat bar. The vacuum is then introduced into the cavity by having one or more vacuum valves passing through the bar directly into the cavity rather than into the hollow of the manifold and then into the cavity via a series of passages. This reduces the overall height of the manifold and is very useful in applications where height is limited.

In another embodiment of the invention a support, for example in the form of a rigid channel, is positioned between the inner and outer seals to prevent them being deformed into the cavity and blocking it. The support can be of metal, e.g. aluminium, and should have holes or other passages therein to allow passage of vacuum from the manifold to the cavity.

BRIEF DESCRIPTION OF THE DRAWINGS

The invention will be described further, by way of example, with reference to the accompanying drawings, in which:

FIG. 3 is a similar view to FIG. 1 of a second embodiment;

FIG. 4 is a similar view to FIG. 1 on a smaller scale of a third embodiment;

FIG. 5 is an enlarged view of the outer seal of FIG. 4; and

FIG. 6 is an enlarged view of the inner seal of FIG. 4.

DESCRIPTION OF PREFERRED EMBODIMENT

Figure 1:
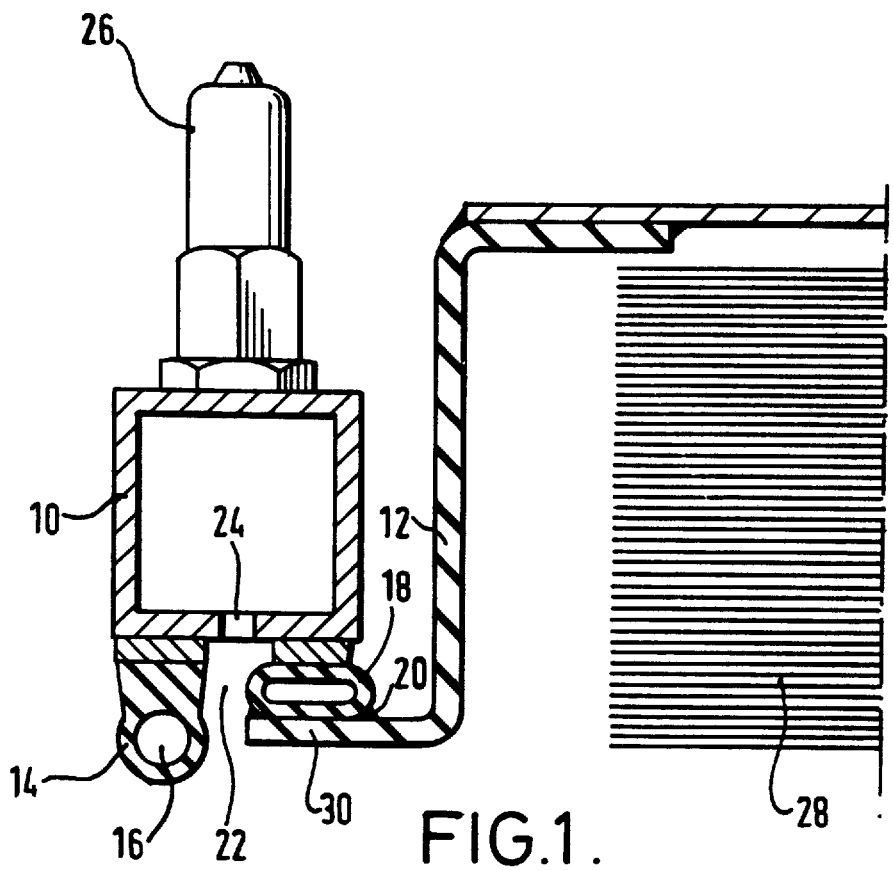
FIG. 1 is a partial sectional view of an apparatus in accordance with one aspect of the present invention.
Figure 2:
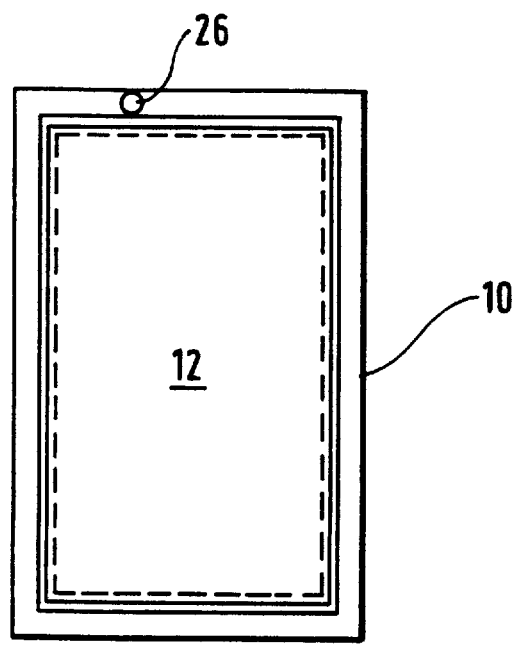
FIG. 2 is plan view of the apparatus on a reduced scale.

Referring to the drawings, and in particular FIGS. 1 and 2, there is illustrated a vacuum manifold 10, for example of aluminium, to which is affixed a stretchable membrane or hood 12. An outer seal 14 is bonded to the underside of the manifold 10. The configuration of the seal 14 is such that there is a hollow portion 16 and the seal will in practise squash against a mould base to provide a good sealing contact. A second, inner, seal 18 is also provided and this is bonded at 20 to the membrane 12. As illustrated in FIG. 1 the inner seal 18 is "squashed" before bonding so as to give a good area for the adhesive to work on. In practise it will relax somewhat more than illustrated in FIG. 1 after bonding.

The seals 14,18 are of a resilient elastomeric material and between them define a cavity 22. The seal cavity communicates with the interior of the manifold 10 via one or more passages 24, and the manifold 10 is provided with one or more vacuum valves 26 by which a vacuum may be drawn in the interior of the manifold 10 and thus via the passages 24 within the cavity 22.

In use, a stack of composites to be cured, for example a stack of printed circuit boards 28, is placed on the mould base (not shown) and the apparatus of the invention placed over the stack so that the seal 14 is in contact with the mould base round the entire periphery of the stack 28. Some pressure may be applied to the manifold 10, for example by means of clips on the top of a manifold to the bottom of the mould base, so as to squash the seal 14 and bring the already slightly squashed seal 18 into contact with the mould base, or more properly, the lower face of the extreme periphery of the hood 12 into contact with the mould base. A vacuum may be pulled via the valve 26 which will communicate with the cavity 22 and thereby draw the manifold 10 tightly into contact with the mould base. The valve may be a non-return valve and the source of vacuum removed leaving the manifold tightly gripping the outer periphery of the mould base. A vacuum will then be pulled within the membrane 12 compressing the stack 28 by means known per se.

Since the outer peripheral edge 30 of the membrane 12 is flat against the mould base (rather than being against the lower portion of the manifold) the stress which used to occur at this point has now been eliminated.

Turning now to FIG. 3, and using like numerals for like parts, it can be seen that the seal 18 has been reversed and is affixed only to the outer periphery 30 of the membrane 12 it will be seen that the overall height of the seal 18 and outer peripheral portion 30 of the membrane 12 is the same as the overall height of the seal 14 so that the two are balanced in height both before and after compression. Operation of the device is very similar to the first embodiment except that the membrane and manifold are separately positioned before drawing vacuum in the cavity 22. The especial advantage of this embodiment is that a number of different sized membranes 12 can be provided with a single manifold 10 thus saving expense and storage spaced as previously referred to.

For some applications, in particular the production of printed circuit boards, it may be desirable for the top of the membrane 12 to be replaced with a metal plate 32 to improve heat transfer to the top of the stack. Similarly, the outer peripheral portion 30, or part of it, can also be replaced by a metal plate if desired. This ensures that the membrane lies flat, especially with the embodiment of FIG. 3, and gives dimensional stability to the hood since the seal can't pull away.

While the above embodiments have been descibed with a hollow manifold 10 this could be replaced with a flat bar manifold where the valve or valves 26 communicate directly with the cavity 22 in effect replacing the passages 24.

Turning now to FIGS. 4 to 6, and again using like numerals for like parts, an aluminium channel 34 is positioned in the cavity 22, physically separating the seals 14a and 18a. The channel 34 has a plurality of holes drilled in its upper face so as to communicate with the interior of the manifold 10 and allow vacuum to pass into the cavity 22. The height of the channel 34 is chosen to be somewhat less than the height of the inner and outer seals 14a and 18a. The latter are also modified. Inner seal 18a has a generally square section with an approximately triangular section 36 cut out to give it more resilience. Outer seal 14a is also generally square in section but has an outwardly extending tapered curtain 38 and a small cut-out section 40. The inner seal 18a is attached to the hood as before.

In operation, the curtain 38 of the outer seal forms a loose seal with the mould base edge which facilitates the whole unit being pulled into sealing contact with the mould by the application of vacuum. When vacuum is applied and reaches the cavity 22, both seals compress until the channel 34 touches the mould base and prevents further movement. The distortion of the seals is not therefore so great, and the presence of the channel 34 prevents distortion of the seals into the cavity 22 which could block the cavity and actually prevent the vacuum acting on the mould base and holding the unit firmly in place.

I claim:

1. An apparatus for forming composite articles which comprises a stretchable or pre-shaped membrane (12) adapted to be placed on a mould and a rigid framework (10) carrying an outer seal (14a), there being an inner seal (18a) attached to the membrane and located between the membrane and the inner side of the rigid framework (10) defining a vacuum activity (22), the membrane being attached to the inner seal on a lower part, thereof characterised in that the seals are substantially square in section and have cut-out sections (36, 40) to enhance resilience, and in that the outer seal has an outwardly directed downwardly extending curtain portion (38) to form an initial loose seal with a mould base.

2. An apparatus as claimed in claim 1 wherein a number of membranes (12) of different pre-shaped sizes are provided with a single manifold thus allowing stacks of composites of different sizes and configuration to be moulded without requiring a separate seal and manifold assembly for each one.

3. An apparatus as claimed in claim 1 wherein the framework (10) comprises a flat bar and vacuum is then introduced into the cavity by having one or more vacuum valves (26) passing through the bar directly into the cavity (22).

4. An apparatus as claimed in claim 1 wherein a support (34) is positioned between the inner and outer seals to prevent them being deformed in to the cavity (22) and blocking it.

5. An apparatus as claimed in claim 4 wherein the support (34) is a metal channel and has holes or other passages therein to allow passage of vacuum from the framework to the cavity (22).

6. An apparatus as claimed in claim 5 wherein the channel (34) is of lesser height than the seals (14a,18a).

* * * * *